W. G. SMITH.
DIMMER FOR AUTOMOBILE LAMPS.
APPLICATION FILED AUG. 4, 1915.

1,185,850.

Patented June 6, 1916.

WITNESSES:
Alan Franklin
P. S. Pidwell

INVENTOR.
Wm. G. Smith
BY John H. Miller
ATTORNEY.

UNITED STATES PATENT OFFICE.

WILLIAM G. SMITH, OF SANTA CLARA, CALIFORNIA.

DIMMER FOR AUTOMOBILE-LAMPS.

1,185,850.   Specification of Letters Patent.   Patented June 6, 1916.

Application filed August 4, 1915. Serial No. 43,581.

*To all whom it may concern:*

Be it known that I, WILLIAM G. SMITH, a citizen of the United States, residing at Santa Clara, in the county of Santa Clara, in the State of California, have made a new and useful Invention—to wit, Dimmers for Automobile-Lamps; and I do hereby declare the following to be a clear, concise, and exact description of the same.

The invention contemplates an apparatus for dimming the light of an automobile lamp which may be operated so as to be brought into or thrown out of effective position with relation to the lamp when desirable by an occupant of the automobile.

In this specification and annexed drawing, I illustrate the invention in the form which I consider the best, but it is to be understood that I do not limit myself to such form because the invention may be embodied in other forms, and it is also to be understood that in and by the claims following the description herein I desire to cover the invention in whatever form it may be embodied.

Figure 1:
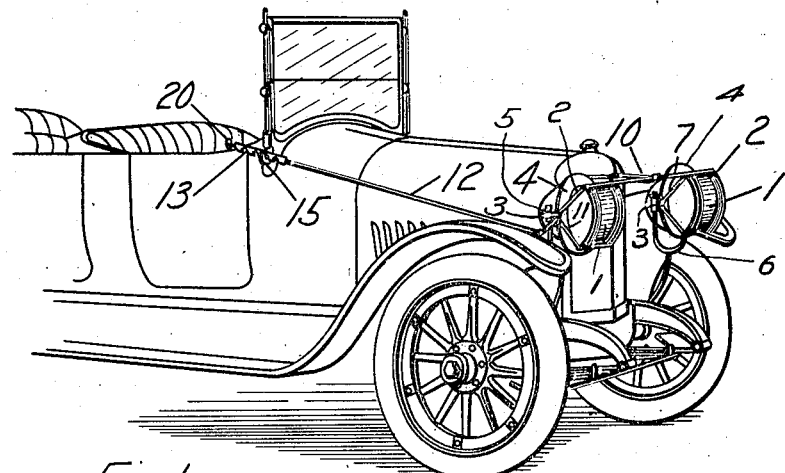
Figures 2, 3, 4:
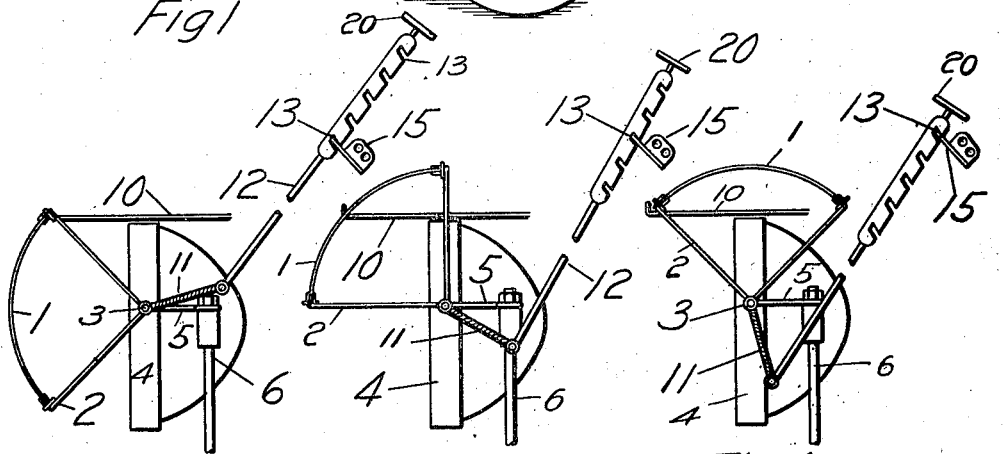
Figure 5:
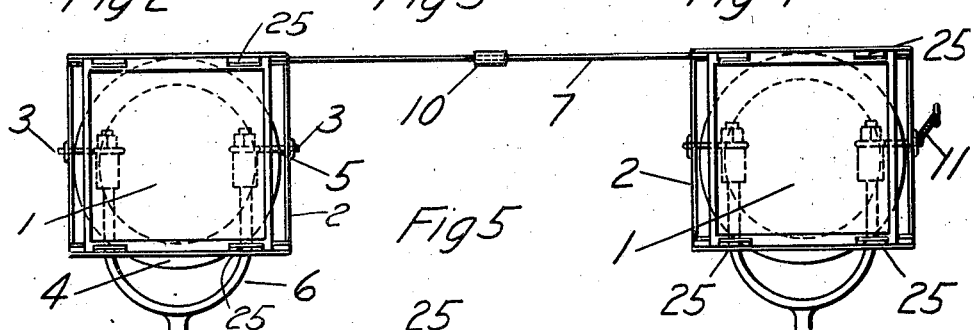
Figure 6:
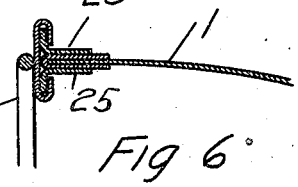

Referring to the drawing: Figure 1 is a perspective view of my invention in position on an automobile. Fig. 2 is a side view of an automobile lamp and my dimmer, with the dimmer in front of the lamp to dim the light of the lamp. Fig. 3 is a side view of the lamp and dimmer with the dimmer in position to dim only a portion of the light of the lamp. Fig. 4 is a side view of the lamp and dimmer with the dimmer in its ineffective position. Fig. 5 is a front elevation of the dimmer and the automobile lamp, the dimmer being shown in dimming position. Fig. 6 is a sectional view of a detail of construction of the dimmer.

The invention comprises a lamp shade 1 mounted upon a frame 2. A frame 2 with its shade is pivoted at 3—3 at the respective sides of each of the two front automobile lamps 4 to brackets 5 secured to the lamp supports 6. A rod 7 connects the two frames 2 so that they swing together on their pivots 3—3. A bracket 10 secured to the front of the automobile and extending forwardly therefrom is adapted to engage the rod 7 and arrest the forward and downward swinging movement of the frame 2 in such position that the shades 1 will rest directly in front of the lamps 4 and cover the entire face of the lamps as shown in Figs. 1, 2 and 5 so as to dim the light of the lamp. An arm 11 secured to one of the frames 2 is connected to a rod 12 the rear end of which is provided with a series of notches 13 which are adapted to engage with a lug 15 on the automobile body near the front seat of the automobile to lock the dimmer in its desired relation to the lamps 4 and to support the rear end of the rod in position where it may be conveniently reached by a person in the front seat of the automobile. The rear extremity of the rod has a knob 20 which may be grasped to push the rod forwardly or pull it rearwardly to operate the dimmer.

The shade 1 may be detachably mounted on the frame 2 by means of clips 25 arranged in pairs secured to the frame, between which pairs of clips opposite edges of the shade are adapted to fit. Different shades may be used if desirable. One shade may be removed from the frame and another inserted in the frame in its place.

The shade 1 may be of any suitable material which will dim the light of a lamp when it covers the face of the lamp. In practice I have found that a shade of celluloid, shellacked and coated with ground colored glass diffuses and dims an automobile lamp light desirably when placed in front of the lamp.

When used in connection with an automobile lamp the shade 1 and frame 2 normally rest in their uppermost position as shown in Fig. 4 above the face of the lamp in which position the face of the lamp is exposed so that the light may be projected from the lamp in the usual manner. The shade and frame are held in such position by the engagement of the lugs 15 with the rearmost notch 13 in the rod 12.

When it is desired to bring the shade entirely in front of the face of the lamp so as to dim the light completely the occupant of the front seat of the automobile grasps the knob 20, disengages the rearmost notch 13 from the lug 15 and pulls the rod rearwardly so that the frame swings on its pivots 3 until the shade covers the face of the lamp completely and the rod 7 engages the bracket 10 and prevents the shade and frame from swinging downwardly out of such position. The forward notch 13 in the rod 12 is then brought into engagement with the lug 15 and the frame and shade are locked firmly in complete dimming position as shown in Fig. 2.

When it is desired to dim only a portion of the light, the frame 2 may be swung on its pivots until the shade covers only an upper portion of the face of the lamp, as shown in Fig. 3, in which position only the upper portion of the light of the lamp is dimmed. The frame and shade may be locked in such position by the engagement of an intermediate notch 13 with lug 15.

My dimmer while dimming the front automobile lights is of great utility in preventing collisions of automobiles at night due to the fact that the drivers are unable to see other automobiles with a strong front light when approaching closely to the other automobiles. My dimmer may be brought in front of the automobile light to dim the lights when the driver sees another automobile at a distance, so that when the two automobiles approach each other closely the dimmed lights will enable the driver to see the other automobile properly so as to avoid running into it.

In the present embodiment of my invention the shield 1 is concavo-convex, the front surface thereof being concave and the rear surface convex, but I do not limit myself to this particular form of shield. The concave and convex surfaces may be reversed or the shield may be straight or any other desirable shape.

I claim:

1. A dimmer having a frame with a top cross bar and a bottom cross bar, clips secured to the top cross bar, clips secured to the bottom cross bar, and a concavo-convex shade removably engaged by said clips.

2. In combination with an automobile and front lamps, a dimmer for each lamp pivotally mounted on the automobile, a rod connecting said dimmers so that they swing together, means for swinging said dimmers into dimming or ineffective position, and a bracket independent of the last mentioned means and extending forwardly from the automobile to engage said rod and arrest the dimmers in dimming position.

In testimony whereof, I have hereunto set my hand at San Francisco, California, this 27th day of July, 1915.

WILLIAM G. SMITH.

In presence of—
ALAN FRANKLIN,
P. S. PIDWELL.